Figure 1:
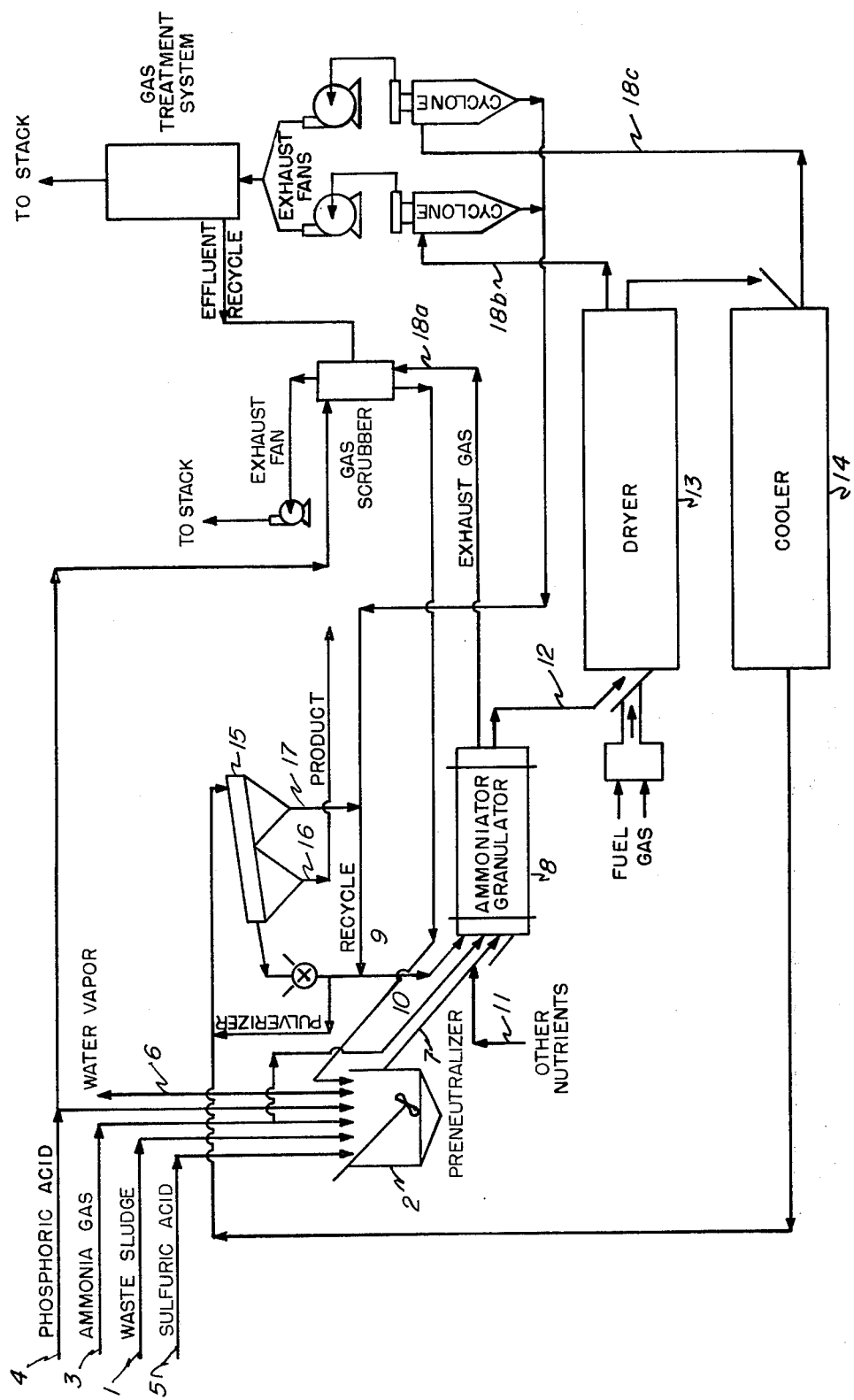

United States Patent [19]

Schultz et al.

[11] 4,028,087
[45] June 7, 1977

[54] FERTILIZER PROCESSES INCORPORATING SCRUBBED FLUE GAS SLUDGE BYPRODUCT

[75] Inventors: James J. Schultz; Vincent J. Van Pelt, both of Florence, Ala.

[73] Assignee: Tennessee Valley Authority, Muscle Shoals, Ala.

[22] Filed: Oct. 18, 1976

[21] Appl. No.: 733,395

Related U.S. Application Data

[63] Continuation of Ser. No. 660,054, Feb. 23, 1976, now Defensive Publication No. T955,002.

[52] U.S. Cl. .................................. 71/25; 71/34; 71/37; 71/40; 71/43; 71/63; 71/64 C; 71/64 DA; 423/312

[51] Int. Cl.$^2$ ........................................ C05F 7/00

[58] Field of Search ............... 71/1, 25, 31, 34, 37, 71/40, 41, 43, 63, 64 C, 64 DA; 423/312, 313, 320, 321

[56] References Cited

UNITED STATES PATENTS

| | | | |
|---|---|---|---|
| 3,241,943 | 3/1966 | Bystrom | 71/25 X |
| 3,310,371 | 3/1967 | Lutz | 71/43 X |
| 3,317,306 | 5/1967 | Getsinger et al. | 71/43 |
| 3,733,191 | 5/1973 | Meline | 71/43 X |
| 3,929,586 | 12/1975 | Slikkers et al. | 71/25 X |

Primary Examiner—Frank A. Spear, Jr.
Assistant Examiner—Ferris H. Lander
Attorney, Agent, or Firm—Robert A. Petrusek

[57] ABSTRACT

A process for the production of a granular fertilizer material from sludge materials discharged from scrubbing processes that remove pollutants from boiler flue gases. Waste sludge discharged from flue gas scrubber systems often contain large amounts of calcium and sulfur as well as lesser amounts of other compounds known to have plant nutrient value. The sludge is treated with an acid such as phosphoric, sulfuric or nitric, or a mixture of these, and ammonia. The resulting sludge-ammonia-acid salt mixture is combined with partially dried, previously processed solid material (recycle) in a horizontal rotating vessel. Additional ammonia and/or acid is added to the rotating vessel to cause the sludge-salt mixture to solidify and granulate. Other plant nutrients may be added to the rotating vessel during granulation. The granulated material discharged from the rotary vessel is further processed (dried, cooled, and screened) to obtain desirable moisture content and particle size.

8 Claims, 3 Drawing Figures

PROCESS FOR THE PRODUCTION OF SOLID GRANULAR FERTILIZER MATERIAL FROM SCRUBBER SLUDGE

LABORATORY EQUIPMENT USED TO PREPARE GRANULAR FERTILIZER FROM WASTE SCRUBBER SLUDGE

FERTILIZER PROCESSES INCORPORATING SCRUBBED FLUE GAS SLUDGE BYPRODUCT

The invention herein described may be manufactured and used by or for the Government for governmental purposes without the payment to us of any royalty therefor.

This application is a continuation of copending application Ser. No. 660,054, filed Feb. 23, 1976, for FERTILIZER PROCESSES INCORPORATING SCRUBBED FLUE GAS SLUDGE BYPRODUCT, now Def. Publ. T955,002, 2/1/77.

Our invention relates to an improved and useful method for disposing of waste sludge materials discharged from scrubbing processes that remove pollutants (usually particulate matter and sulfur dioxide) from fossil fuel-burning electric power plant stack gases. When pollutants are removed from such stack gases with some processes, lime and limestone wet scrubbing, for example, disposal of sludge discharged from the scrubber system is a significant and often costly problem. When lime or limestone is used for reaction with the sulfur dioxide in the flue gases, the resulting sludge is an aqueous mixture of calcium-sulfur reaction products, unreacted calcium compounds and fly ash. Thickening and/or vacuum filtration techniques are effective in dewatering the sludge to about 40 to 60 percent solids by weight. The dewatered sludge is thixotropic and it cannot be handled with conventional dry material handling equipment. However, it can be easily fluidized by agitation and then pumped. The dewatered sludge does not dry or harden during storage and it has essentially no mechanical or bearing strength. Because of these properties, and the large amount of sludge produced, pond-like enclosures are normally used for disposal. About 7000 tons per day of dewatered sludge (containing 50 percent solids by weight) would be produced by a limestone wet scrubber serving a 1000-megawatt electric generating unit that burned coal containing 4–5 percent sulfur and about 20 percent ash.

Methods for stabilizing (hardening) the sludge with additives such as lime, plaster of Paris, Portland cement, fly ash, or various other ingredients have been developed (U.S. Pat. No. 3,785,840, Minnick et al.) and are reported to be commercially available. The stabilized sludge has properties that make it suitable for landfill or other disposal techniques that do not require pond storage. Stabilization processes are costly due to large equipment and space requirements, and large quantities of relatively expensive additives. The stabilized sludge has little or no commercial value.

While sludge stabilization processes have useful applications in some situations, they are usually not a desirable treatment technique for sludge produced by an electric-generating scrubber system because of (1) the large amount of land space required for the treatment facilities and ultimate disposal of the treated sludge, (2) the large quantities of relatively expensive additives required to obtain adequate properties for stabilization, and (3) the cost of these additives and the cost of processing cannot be recovered because the large quantity of stabilized material has little or no commercial value.

The present invention is useful and desirable because it overcomes most of the disadvantages described above which are inherent to stabilization processes as a method of sludge disposal. The instant invention utilizes the plant nutrient value of the sludge, specifically calcium and sulfur compounds and other compounds of elements found in the sludge that are essential and desirable for plant growth. The nutrient value inherent to the sludge is further increased by the addition of other primary plant nutrients, specifically compounds of nitrogen and phosphorus. The addition of nitrogen in the form of ammonia and phosphorus as phosphoric acid to the sludge under known and controlled conditions causes the wet, normally difficult to handle sludge, to become fluid, and upon the further processing to solidify to form a hard granular fertilizer material containing a large amount of plant nutrient value. The dry solid fertilizer material is easy to store, handle, and distribute with conventional solids handling equipment and agricultural machinery.

Another advantage of the instant invention is that the cost of the additives required for the process, usually ammonia and phosphoric acid, plus the cost of production are recovered because a useful and economically competitive fertilizer material is produced. The effect of the nutrient values of the fertilizer produced from waste sludge compared with the nutrient values obtained from conventional fertilizer materials is shown in Table I below.

Table I

Comparison of the Effect of Nutrients Obtained from Fertilizer Produced from Waste Sludge with Conventional Nutrient Sources on the Yield of Forage (Fescue)

| Source of nutrient | Nutrient evaluated | Quantity of nutrient applied per test pot, mg | Yield of forage per test pot, mg |
|---|---|---|---|
| Waste sludge fertilizer 5-20-0[a] | Nitrogen (N) | 1000 | 4100 |
| Ammonium nitrate 33-0-0[a] | Nitrogen (N) | 1000 | 4600 |
| None | Nitrogen (N) | 0 | 1700 |
| Waste sludge fertilizer 5-20-0[a] | Phosphorus (P) | 4000 | 16,267 |
| Concentrated superphosphate 0-46-0[a] | Phosphorus (P) | 4000 | 16,933 |
| None | Phosphorus (P) | 0 | 4100 |

[a] Indicates percent by weight of equivalent N, $P_2O_5$, and $K_2O$.

Still another advantage of the instant invention is that the fertilizer product contains additional plant nutrients that are not usually found in conventional fertilizer materials. Examples of these are iron, sodium, manganese, zinc, and magnesium.

In order that those skilled in the art may better understand how the present invention can be practiced to produce a fertilizer product, a typical process is given by way of illustration and not by way of limitation.

The process for producing granular fertilizer from waste sludge is shown in FIG. 1. In the process depicted, waste sludge is combined and reacted with phosphoric acid and ammonia. The resulting slurry mixture is further treated with ammonia in a rotating vessel where the combination of chemical reaction and physical tumbling causes the slurry material to solidify and granulate. The granular material is then dried, cooled, and screened to prescribed product moisture and size specifications. A more detailed discussion of each process step follows.

Waste sludge from the boiler flue gas treatment system (not shown), either reclaimed from a storage pond or obtained direct from the flue gas treatment system, is fed via line 1 to reaction vessel (preneutralizer) 2, along with a quantity of ammonia gas via line 3 and phosphoric acid via line 4 and/or sulfuric acid via line 5. The exothermic chemical reaction between the waste sludge, acid, and ammonia causes a large amount of water contained in the sludge to evaporate and off-gas via line 6.

Decomposition of the calcium-sulfur compounds in the waste sludge, especially calcium sulfite, causing the liberation of sulfur dioxide, is prevented by the method of introduction of acid, ammonia, and waste sludge to preneutralizer vessel 2.

The mole ratio of the ammonia to phosphoric acid (N/P) is maintained between 0.5 and 0.7 or 1.4 and 1.5 to obtain a fluid slurry in preneutralizer vessel 2 that can be easily conveyed via line 7 to rotary ammoniator-granulator vessel 8. Partially dried, previously processed solid material (recycle) along with fluid slurry from the preneutralizer vessel 2 is fed via line 9 to ammoniator-granular vessel 8. Additional ammonia is added via line 8 to the material in ammoniator-granulator vessel 8 to increase the N/P mole ratio to about 1.0 or 2.0 depending on the product desired. This addition of ammonia to the tumbling and rolling mass of slurry and recycle material causes the slurry to solidify and form solid granules. Other nutrients (for example, potassium salts) can also be added via line 11 during the ammoniation-granulation step in vessel 2. The granulated product discharged via line 12 from the ammonia granulator is subsequently dried in dryer 13, cooled in cooler 14, and screened in screens 15 to specified particle size. A portion of the product and/or off size material is fed as recycle via lines 16 and 17, respectively, from the screening, drying, and cooling operations to ammoniator-granulator 8 to aid in granulation of fresh slurry from preneutralizer 2.

Exhaust gases from ammoniator 8, dryer 13, and cooler 14 are collected via lines 18(a-c) and treated to remove pollutants before being discharged to the atmosphere. As shown, effluents from the treatment process are recycled to the granulation process or further treated to obtain acceptable discharge standards.

The process as described is operated on a continuous basis. However, it can also be performed on an intermittent or batch basis.

The amount of recycled in-process material required per unit of fresh slurry from the preneutralizer vessel is primarily dependent upon the initial N/P mole ratio in the preneutralized slurry and the desired N/P mole ratio in the finished fertilizer product. Other factors that affect the recycle/fresh slurry ratio and therefore the ultimate capacity of a given production unit are the ratio of waste sludge to ammonia and acid and the amount of free water contained in the waste sludge.

Figure 2:
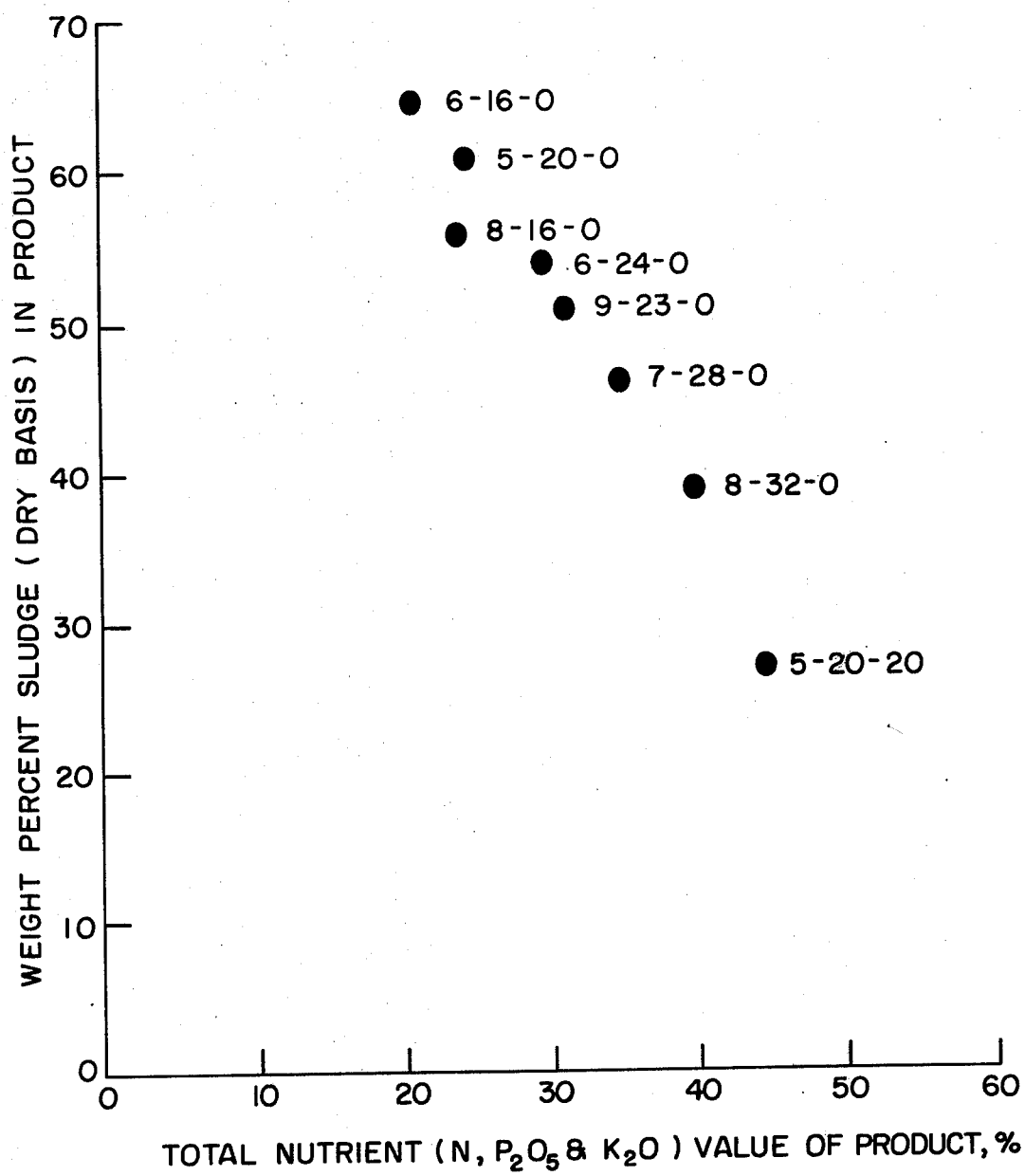

The amount of waste sludge used in the production of various grades of fertilizer is shown in FIG. 2.

Figure 3:
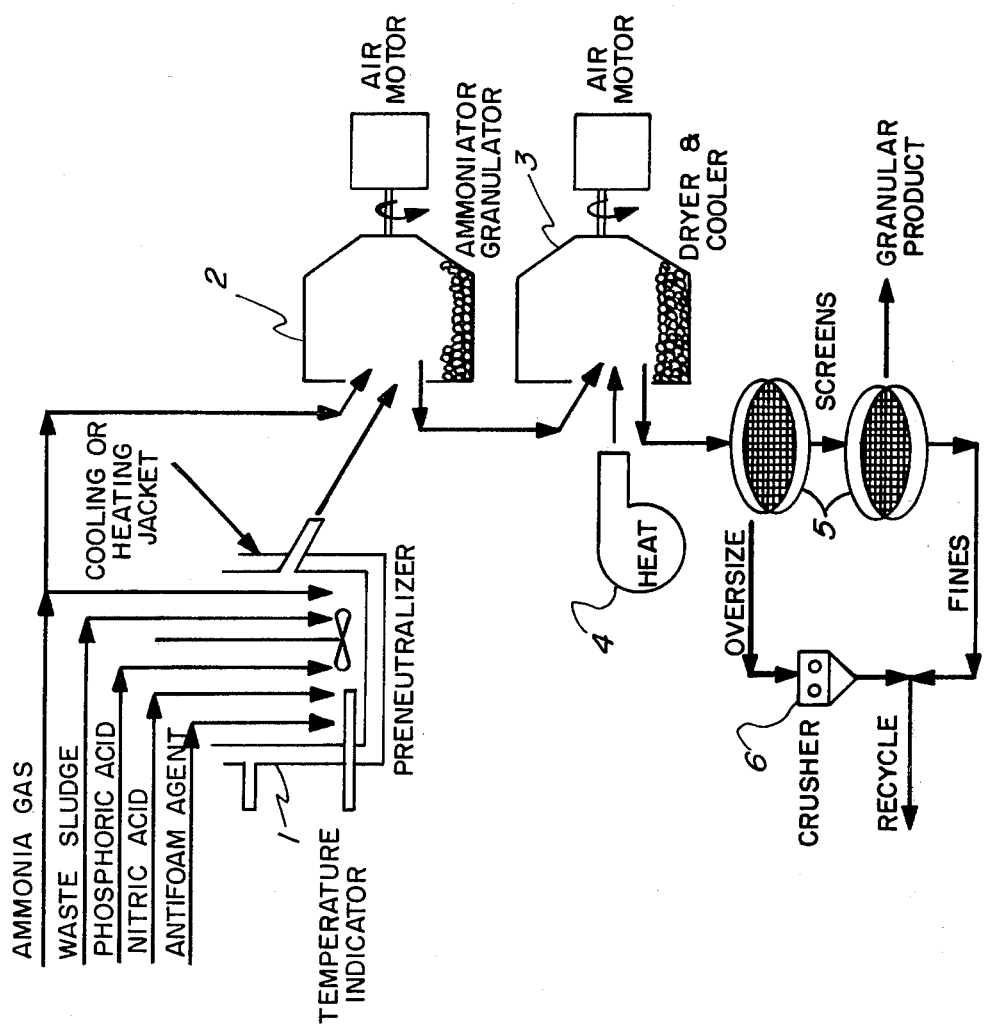

Several grades of granular fertilizer were prepared in the laboratory equipment shown in FIG. 3. The laboratory equipment was arranged to perform the following functions which were previously described and shown in FIG. 1, supra:
  Preneutralization (primary ammoniation)
  Final ammoniation and granulation
  Drying
  Cooling
  Screening The preneutralizer vessel 1 was made of Type 316 stainless steel. It was 6 inches in diameter and 9 inches high. An overflow spout one-half inch in diameter was located 4 inches above the bottom of the vessel. The overflow spout insured a constant level of material in the vessel during periods of continuous operation. The preneutralizer was equipped with an outer jacket to facilitate the addition or removal of heat during the preneutralization reaction. A variable speed agitator was used to mix the reacting mass.

The ammoniator-granulator 2, made of Type 316 stainless steel, was 10 inches in diameter and 10 inches deep. It was closed on one end and had a retaining dam on the open end to contain the material yet provide access for the addition of preneutralized slurry and ammonia. The ammoniator-granulator could be rotated at various rates to give a shell speed of 160 to 225 feet per minute. The preferred shell speed for most tests was about 160 feet per minute. Preneutralized slurry was added to the rotating ammoniator-granulator along with previously prepared recycle material and ammonia gas. The combination of ammonia together with the tumbling caused by the rotating vessel caused the slurry to solidify and granulate.

Drying and cooling was performed in an identical rotary unit 3. An electrically heated air blower 4 provided heat for drying the granulated material. After the material was dried to about 4 percent moisture, tumbling was continued without addition of hot air and the material was cooled to about 70°–100° F before it was screened. The desired product size material was used for crop response and physical testing. The oversize material was crushed in crusher 6 and returned to the ammoniator-granulator along with undersize material and fresh preneutralized slurry to produce more product.

In order that the process may be better understood by those skilled in the art, some examples of the laboratory preparation of granular fertilizer from waste scrubber sludge are given.

EXAMPLE I

EXAMPLE I

| Batch Operation with all Ammonia Added to Preneutralizer | |
|---|---|
| Material added to preneutralizer | Weight, gm |
| Waste sludge<br>50 percent solids<br>50 percent water | 300 |
| Phosphoric acid<br>85 percent $H_3PO_4$<br>15 percent water | 72 |
| Ammonia gas<br>99 percent $NH_3$ | 16 |
| Maximum temperature of reacting mass: 200° F | |
| Nominal grade of fertilizer produced:<br>5 percent N, 20 percent $P_2O_5$,<br>0 percent $K_2O$ (dry basis) | |

During the batch tests, the addition of sludge, acid, and ammonia was varied with respect to rate and location in the preneutralizer to determine the variables that effected (1) decomposition of the calcium sulfite in the waste sludge to liberate $SO_2$ gas, (2) foaming caused by release of $SO_2$ and $CO_2$ gases, and (3) fluidity of the slurry mass.

Simultaneous addition of acid and ammonia below the surface of a stirred pool of waste sludge prevented liberation of $SO_2$. Excessive foaming in the preneutralizer caused by liberation of $CO_2$ gas was prevented by the addition of about 10 grams per minute of a 1.0 percent solution of an organic antifoam agent during the addition of acid and ammonia. Maximum fluidity and excellent flow properties of the preneutralized slurry were obtained when 50 to 60 percent of the ammonia required to obtain a 1.2 to 1.3 N:P mole ratio in the finished granular product was added to the preneutralizer. The balance of the ammonia was added during the ammoniation-granulation step. When all of the ammonia required to obtain a 1.2 to 1.3 N:P mole ratio in the finished product was added to the preneutralizer, the mass of slurry solidified and could not be readily removed from the preneutralizer.

EXAMPLE II

Continuous Operation of the Preneutralizer with 50 Percent of the Required Ammonia Added Followed by Final Ammoniation and Granulation in Rotary Vessel on Batch Basis

| Material added to preneutralizer | Weight, gm/min |
|---|---|
| Waste sludge<br>35 percent solids<br>65 percent water | 360 |
| Phosphoric acid<br>75 percent $H_3PO_4$<br>20 percent water | 86 |
| Ammonia gas<br>99 percent $NH_3$ | 7.5 |
| Antifoam solution<br>1 percent active material<br>99 percent water | 5–10 |
| Maximum temperature of reacting mass: 175° F | |
| Moisture content of preneutralized slurry: 20–28 percent | |
| N:P mole ratio in preneutralized slurry: 0.65 | |
| Percent of sulfur in sulfite ($SO_3^=$) form oxidized to sulfate ($SO_4^=$): 15–20 | |

| Material added to ammoniator granulator | Weight, gm |
|---|---|
| (Batch operation of this unit) | |
| Preneutralized slurry<br>Water content 25 percent<br>N:P mole ratio 0.65 | 265 |
| Ammonia gas<br>99 percent $NH_3$ | 7.5 |
| Moisture content of dried product: 3.8 percent | |
| N:P mole ratio of granulated product: 1.3 | |
| Nominal product analysis: 5 percent N, 20 percent $P_2O_5$, 0 percent $K_2O$ | |

EXAMPLE III

The following nominal grades of granular fertilizer were produced according to the procedure described in Example II.

| | Percent by weight | | |
|---|---|---|---|
| N | $P_2O_5$ | $K_2O^a$ | $H_2O$ |
| 5 | 20 | 0 | 3–4 |
| 6 | 24 | 0 | 2.5 |
| 8 | 16 | 0 | 3.0–3.5 |

$^a$Less than 0.5 percent in all grades.

EXAMPLE IV

Nitric acid was added to a pool of waste sludge in the preneutralizer along with phosphoric acid and ammonia to promote oxidation of the calcium sulfite contained in the waste sludge to calcium sulfate.

| Material added to preneutralizer | Weight, gm/min |
|---|---|
| Waste sludge<br>35 percent solids<br>65 percent water | 157 |
| Nitric acid<br>60 percent $HNO_3$<br>40 percent water | 15 |
| Phosphoric acid<br>75 percent $H_3PO_4$<br>20 percent water | 37 |
| Ammonia gas<br>99 percent $NH_3$ | 8 |
| Nominal dry basis analysis of preneutralized slurry:<br>8 percent N, 20 percent $P_2O_5$, and 0 Percent $K_2O$ | |
| Portion of total sulfur in waste sludge in sulfite ($SO_3^=$) form: 85 percent | |
| Portion of total sulfur in preneutralized slurry in sulfite ($SO_3^=$) form: less than 1 percent | |
| Oxidation of sulfite ($SO_3^=$) sulfur to the sulfate ($SO_4^=$) form: greater than 95 percent | |
| N:P mole ratio in preneutralized slurry: 1.93 | |
| Maximum temperature of reacting mass: 195° F | |
| Moisture content of preneutralized slurry: 25–30 percent | |

It is understood that a large variety of granular fertilizer grades (nutrient ratios) could be produced according to the process described in the instant invention. However, test operation shows that the best operation and quality product is obtained when the N/P mole ratio in the finished product is in the order of 1.2 to 1.3. Likewise, best operation is obtained when the amount of waste sludge (dry basis) added to the process does not exceed 60 percent of the dry product weight. Also, the amount of water in the waste sludge should not exceed 60 percent by weight for optimum operation of the process. Typical formulas for various waste sludge and nutrient ratios and grades are shown in Table II below.

Table II

Typical Formulas and Material Ratios fed to the Preneutralizer and Ammoniator Granulator

| | | Pounds, wet basis | | | | | | | |
|---|---|---|---|---|---|---|---|---|---|
| | Formula$^a$ | 5-20-0 | 5-20-20 | 6-24-0 | 7-28-0 | 8-32-0 | 6-16-0 | 8-16-0 | 9-23-0 |
| Line | Material | | | | | | | | |
| 1 | Dewatered sludge (50% solids) | 2450 | 1118 | 2164 | 1876 | 1592 | 2638 | 2246 | 2076 |
| 3 | Anhydrous ammonia | 59 | 59 | 71 | 82 | 94 | 115 | 164 | 165 |
| 4 | Phosphoric acid (54% $P_2O_5$/20% $H_2O$) | 759 | 759 | 907 | 1056 | 1204 | 611 | 611 | 870 |
| 5 | Sulfuric acid (93% $H_2SO_4$/7% $H_2O$) | — | — | — | — | — | — | 152 | — |
| 10 | Anhydrous ammonia | 69 | 69 | 81 | 95 | 107 | 37 | 43 | 61 |
| 11 | Potassium chloride | — | 667 | — | — | — | — | — | — |
| | Total | 3337 | 2672 | 3223 | 3109 | 2997 | 3401 | 3216 | 3172 |
| | Less water evaporated | 1337 | 672 | 1223 | 1109 | 997 | 1401 | 1216 | 1172 |
| 16 | Product | 2000 | 2000 | 2000 | 2000 | 2000 | 2000 | 2000 | 2000 |

$^a$% by wt. N, $P_2O_5$, and $K_2O$

While we have described and shown particular embodiments of our invention, modifications and variations thereof will occur to those skilled in the art. We wish it to be understood therefore that the appended claims are intended to cover such modifications and variations which are within the true scope and spirit of our invention.

What we claim as new and desire to secure by Letters Patent of the United States is:

1. A process for the production of solid granular fertilizer material wherein at least a portion of the plant nutrient values thereof are derived from waste sludge discharged from boiler flue gas scrubbing processes, which process comprises introducing into a preneutralizer vessel a stream of said waste sludge together with streams of ammonia, sulfuric acid, and/or phosphoric acid to form therein a partially neutralized ammonium sulfate and/or phosphate slurry, said waste sludge containing upwards to about 50 percent by weight water whereby the exothermic heat of reaction of the ammonia and mineral acids in said preneutralizer raises the temperature of the slurry therein sufficiently high to remove, by evaporation, substantial portions of excess water from said sludge; adjusting the relative amounts of ammonia to mineral acid introduced therein to maintain an N:P ratio in said preneutralizer in the range from 0.5 to about 0.7 for effecting fluidization of said slurry and easy transfer to a later-mentioned ammoniator-granulator; introducing a stream of said ammonium sulfate and/or phosphate slurry from said preneutralizer together with a stream of ammoniating fluid and particles of undersize product from a later-mentioned sizing step into the upper end of an inclined rotating drum; adjusting the relative amounts of said stream of ammoniating fluid and said slurry from said preneutralizer vessel to increase the N:P mole ratio of material introduced into said rotating drum to a range of about 1 to about 2; therein maintaining a bed of rolling discrete particles of ammonium sulfate and/or phosphate; recovering ammonia evolved from said rotating drum by passing the offgas therefrom through scrubbing means; returning the recovered ammonia from said scrubbing means to said preneutralizer; withdrawing granular ammonium sulfate and/or phosphate material from the lower end of said rotating drum; introducing said withdrawn material from said rotating drum to drying and sizing means; returning particles of predetermined size from said sizing means into the upper end of said drum and withdrawing from said sizing means granular particles of ammonium sulfate and/or phosphate product; said process being characterized by the fact that less than about 50 percent of the calcium sulfite contained in said waste sludge is converted to calcium sulfate.

2. A process for the production of solid granular fertilizer material wherein at least a portion of the plant nutrient values thereof are derived from waste sludge discharged from boiler flue gas scrubbing processes, which process comprises introducing into a preneutralizer vessel a stream of said waste sludge together with streams of ammonia, sulfuric acid, and/or phosphoric acid to form therein a partially neutralized ammonium sulfate and/or phosphate slurry, said waste sludge containing upwards to about 50 percent by weight water whereby the exothermic heat of reaction of the ammonia and mineral acids in said preneutralizer raises the temperature of the slurry therein sufficiently high to remove, by evaporation, substantial portions of excess water from said sludge; adjusting the relative amounts of ammonia to mineral acid introduced therein to maintain an N:P ratio in said preneutralizer in the range from about 1.4 to about 1.5 for effecting fluidization of said slurry and easy transfer to a later-mentioned ammoniator-granulator; introducing a stream of said ammonium sulfate and/or phosphate slurry from said preneutralizer together with a stream of ammoniating fluid and particles of undersize product from a later-mentioned sizing step into the upper end of an inclined rotating drum; adjusting the relative amounts of said stream of ammoniating fluid and said slurry from said preneutralizer vessel to increase the N:P mole ratio of material introduced into said rotating drum to a range of about 1 to about 2; therein maintaining a bed of rolling discrete particles of ammonium sulfate and/or phosphate; recovering ammonia evolved from said rotating drum by passing the offgas therefrom through scrubbing means; returning the recovered ammonia from said scrubbing means to said preneutralizer; withdrawing granular ammonium sulfate and/or phosphate material from the lower end of said rotating drum; introducing said withdrawn material from said rotating drum to drying and sizing means; returning particles of predetermined size from said drying means into the upper end of said drum and withdrawing from said sizing means granular particles of ammonium sulfate and/or phosphate product; said process being characterized by the fact that less than about 50 percent of the calcium sulfite contained in said waste sludge is converted to calcium sulfate.

3. The process of claim 1 wherein the retention time of the material in said preneutralizer vessel is in the range from about 5 to about 25 minutes.

4. The process of claim 1 wherein the recycle of said phosphate fed to said preneutralizer is in the range from about 2 to about 6 units of material to said fresh slurry.

5. The process of claim 1 wherein more than about 50 percent of the calcium sulfite contained in the waste sludge is converted to calcium sulfate by the addition to said preneutralizer of a strong oxidizing agent.

6. The process of claim 2 wherein the retention time of the material in said preneutralizer vessel is in the range from about 5 to about 25 minutes.

7. The process of claim 2 wherein the recycle of said phosphate fed to said preneutralizer is in the range from about 2 to about 6 units of material to said fresh slurry.

8. The process of claim 2 wherein more than about 50 percent of the calcium sulfite contained in the waste sludge is converted to calcium sulfate by the addition to said preneutralizer of a strong oxidizing agent.

* * * * *

UNITED STATES PATENT AND TRADEMARK OFFICE
CERTIFICATE OF CORRECTION

PATENT NO. : 4,028,087

DATED : June 7, 1977

INVENTOR(S) : James J. Schultz and Vincent J. Van Pelt

It is certified that error appears in the above-identified patent and that said Letters Patent are hereby corrected as shown below:

Column 3, line 22, change "line 8" to -- line 10 -- line 29, change "vessel 2" to -- vessel 8 -- line 30, change "ammonia" to -- ammoniator- --

Column 4, lines 43 and 44, "EXAMPLE I" is printed twice.

Signed and Sealed this

Sixth Day of September 1977

[SEAL]

Attest:

RUTH C. MASON
Attesting Officer

LUTRELLE F. PARKER
Acting Commissioner of Patents and Trademarks